United States Patent [19]

Vacca

[11] Patent Number: 5,763,974
[45] Date of Patent: Jun. 9, 1998

[54] PERMANENT MAGNET ELECTRIC MOTORS, IN PARTICULAR FOR VENTILATION OF MOTOR VEHICLES

[75] Inventor: Frédéric Vacca, Behoust, France

[73] Assignee: Valeo Systems d'Essuyage, La Verriere, France

[21] Appl. No.: 774,108

[22] Filed: Dec. 24, 1996

[30] Foreign Application Priority Data

Dec. 27, 1995 [FR] France .................. 95 15553

[51] Int. Cl.⁶ .................. H02K 15/03; H02K 15/14
[52] U.S. Cl. .................. 310/152; 310/154; 310/89
[58] Field of Search .................. 310/154, 152, 310/156, 89, 91

[56] References Cited

U.S. PATENT DOCUMENTS

| | | | |
|---|---|---|---|
| 3,772,546 | 11/1973 | Means | 310/154 |
| 3,790,830 | 2/1974 | Bonfiglio | 310/42 |
| 3,845,338 | 10/1974 | Fawzy | 310/154 |
| 4,445,060 | 4/1984 | Ruhle et al. | 310/154 |
| 4,580,072 | 4/1986 | Morishita | 310/154 |
| 4,677,330 | 6/1987 | Watanabe et al. | 310/154 |
| 4,745,319 | 5/1988 | Tomite et al. | 310/154 |
| 4,748,358 | 5/1988 | Ruhle et al. | 310/154 |
| 5,057,730 | 10/1991 | Yoshida | 310/91 |
| 5,201,111 | 4/1993 | Prohaska | 310/154 |
| 5,250,866 | 10/1993 | Fukui et al. | 310/154 |
| 5,481,148 | 1/1996 | Moribayashi et al. | 310/154 |
| 5,619,084 | 4/1997 | Lau | 310/154 |

FOREIGN PATENT DOCUMENTS

| | | | |
|---|---|---|---|
| 097875 | 1/1984 | European Pat. Off. | H02K 23/04 |
| 2587150 | 3/1987 | France | H02K 1/18 |
| 1297329 | 11/1972 | United Kingdom | H02K 5/08 |

Primary Examiner—Steven L. Stephan
Assistant Examiner—B. Mullins
Attorney, Agent, or Firm—Morgan & Finnegan, LLP

[57] ABSTRACT

A permanent magnet electric motor comprises a body shell with a cylindrical inner face, permanent magnets lying against the inner face of the body shell, and connecting pieces, each of which has a body portion disposed between two adjacent permanent magnets. Each connecting piece also has two lugs axially adjacent to, and overlapping, end faces of the magnets. An end plate of the motor is fixed to its body shell facing towards these end faces of the magnets. The connecting pieces and the end plate are so arranged that part of the end plate faces towards the connecting pieces in the axial direction, and is adjacent to the latter. The invention is applicable in particular to motors for motor vehicles ventilating systems.

3 Claims, 3 Drawing Sheets

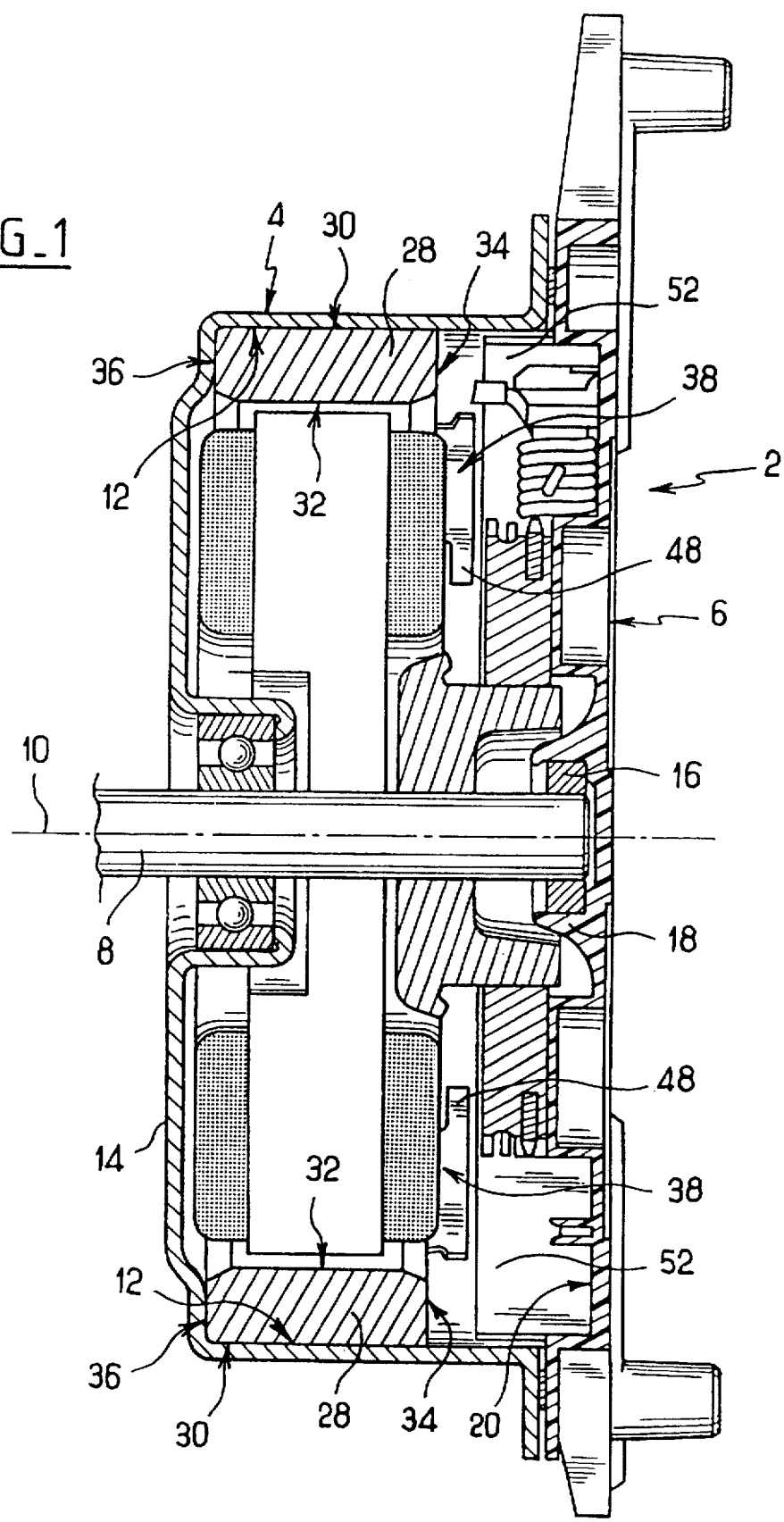
FIG_1

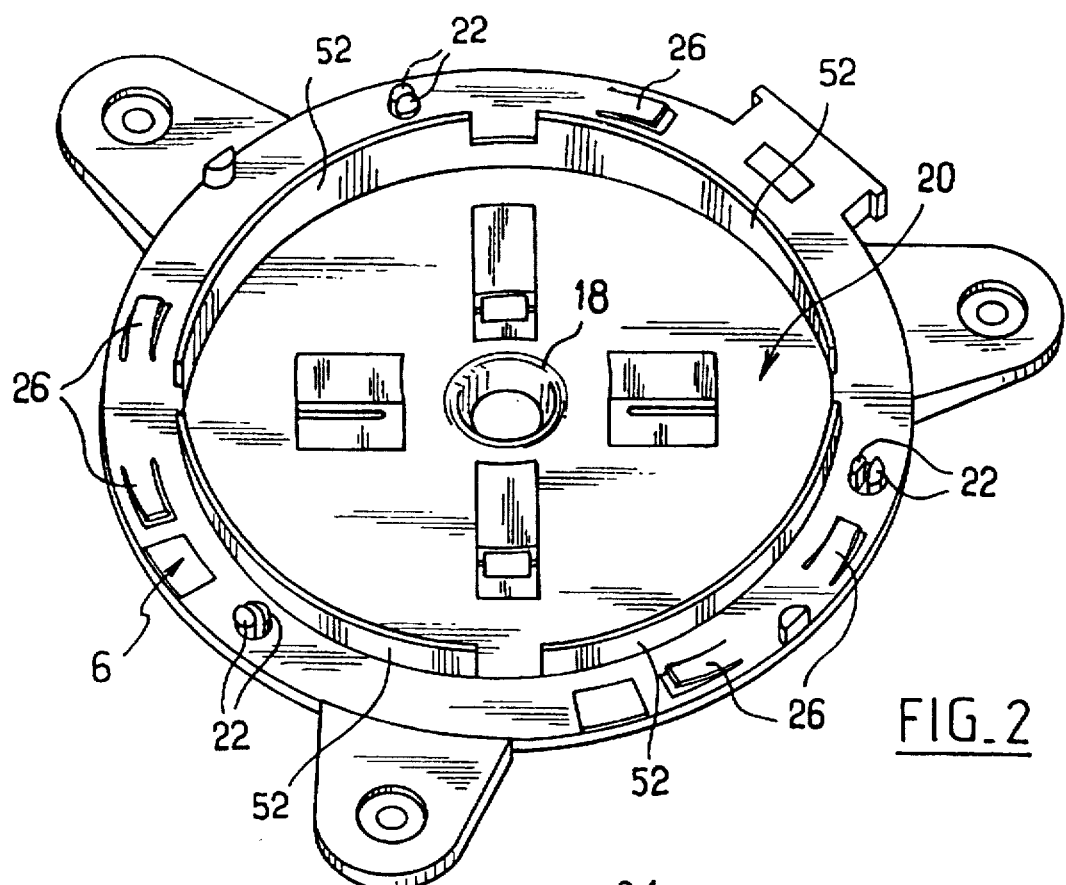
FIG_2
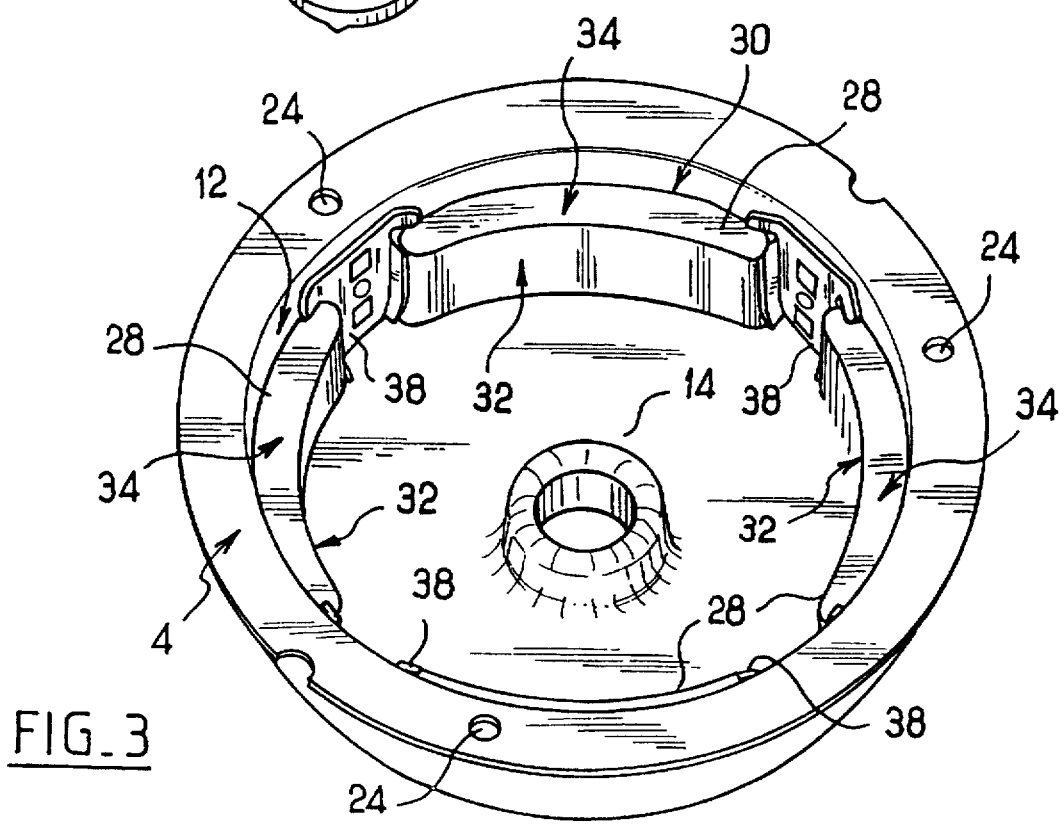
FIG_3

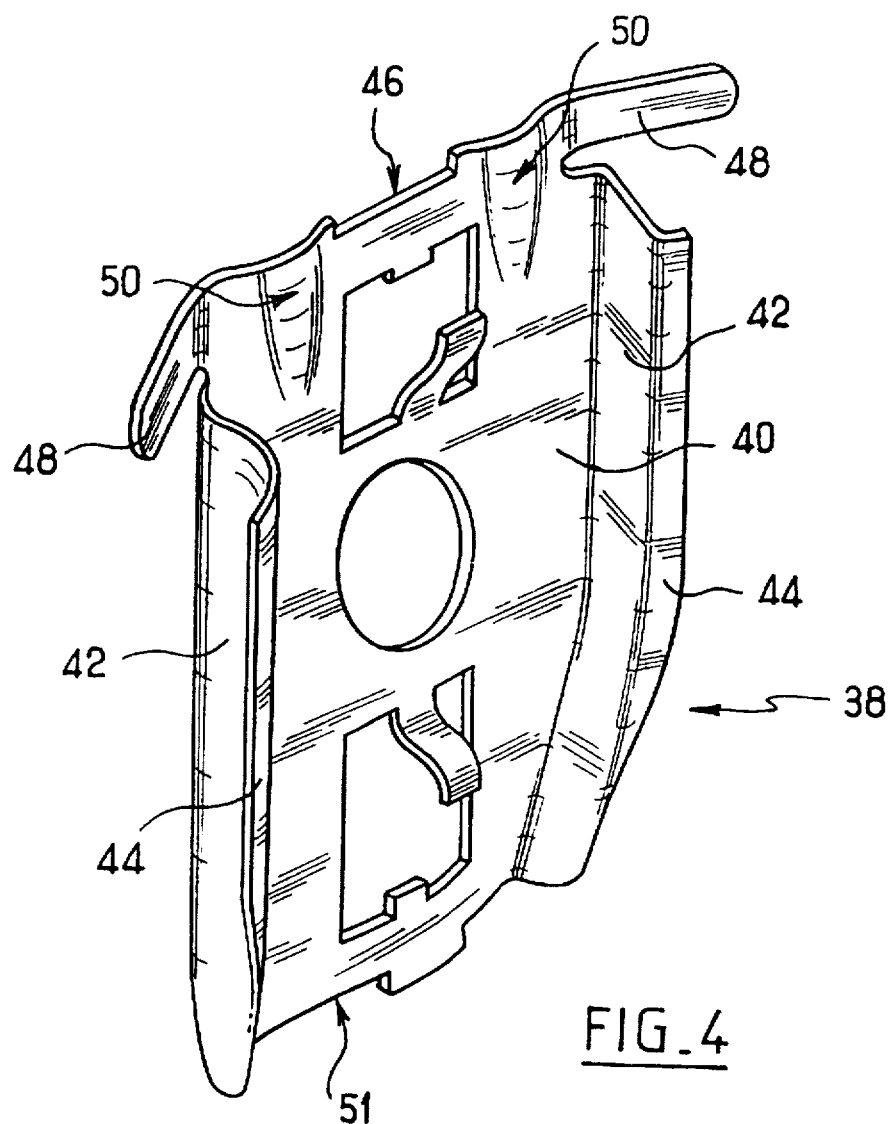
FIG_4
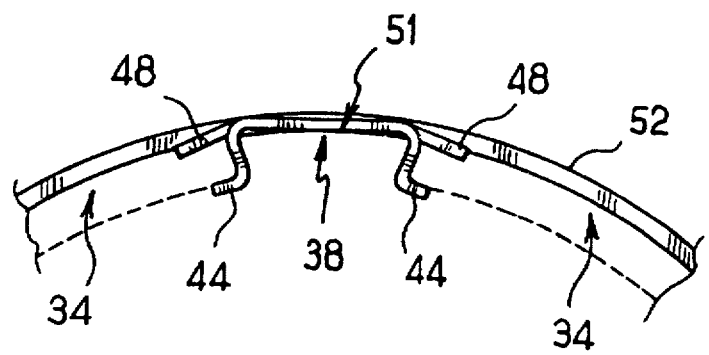
FIG_5

PERMANENT MAGNET ELECTRIC MOTORS, IN PARTICULAR FOR VENTILATION OF MOTOR VEHICLES

FIELD OF THE INVENTION

This invention relates to permanent magnet electric motors, and in particular, though not exclusively, to motors for driving fans or blowers in ventilating systems for motor vehicles, and the like.

BACKGROUND OF THE INVENTION

European patent specification EP 0 154 335A describes an electric motor comprising a carcase or body shell which has a cylindrical inner face, with four permanent magnets which lie against the cylindrical face of the body shell, and four connecting or stabilising pieces, having a U-shaped transverse profile, which are disposed between the magnets so as to preserve the spacing of the magnets from each other. Each of these connecting pieces is fixed to the body shell by local deformation of the wall of the body shell through appropriate apertures in the body of the connecting piece. The connecting piece has four lugs which are bent back on the two end faces of the two adjacent magnets, so as to retain the latter against any axial displacement in both directions (forwards or backwards).

If a motor of the above type drives in rotation a motor vehicle fan with the axis of the motor parallel to the direction of travel of the vehicle, the connecting pieces should retain the magnets in position against any axial displacement of the magnets in the direction corresponding to a severe deceleration of the vehicle (for example in a head-on collision). In order to form such a deformation, of good enough quality to provide proper securing of the connecting piece, it is preferable that the wall of the body shell shall be quite thick. This arrangement is not well suited when, by contrast, it is desired to make a motor with a body shell having a thin wall, with a view to reducing the weight and selling price of the motor.

DISCUSSION OF THE INVENTION

An object of the invention is to overcome this drawback, by providing a permanent magnet electric motor in which the connecting pieces effectively retain the magnets in one direction axially, and in which the body shell wall can be made thinner than in the motors of the prior art.

According to the invention, a permanent magnet motor has a body shell having a cylindrical inner face, permanent magnets lying against the inner face of the body shell, and connecting pieces, each of which comprises a body portion disposed between the respective magnets. The motor, which has two lugs which lie facing towards an axially-facing end face of the magnets to which the lugs are adjacent, is characterised in that the motor further includes an end plate fixed to the body shell in facing relationship with the end face of the magnets. The connecting pieces and the end plate being so arranged that a portion of the end plate lies facing towards the connecting pieces in the axial direction, being adjacent to the connecting pieces.

In the event of an axial shock that tends to displace the magnets towards the end plate, each connecting piece, if the latter has not already been located in abutment on the adjacent portion of the end plate, comes into axial abutment on the adjacent portion and is thus immobilised. In this way, fastening of the connecting pieces to the wall of the body shell is avoided, so that this wall can be made quite thin.

Further features and advantages of the invention will appear more clearly on a reading of the following detailed description of a preferred embodiment of the invention, which is given by way of non-limiting example only and with reference to the accompanying drawings.

BRIEF DESCRIPTION OF THE DRAWINGS

FIG. 1 is a view in axial cross section of a motor in accordance with the invention.

FIG. 2 is a perspective view of the end plate of the motor in FIG. 1.

FIG. 3 is a perspective view of the body shell and magnets of the motor of FIG. 1.

FIG. 4 is a perspective view of a connecting piece in the motor of FIG. 1.

FIG. 5 is a partial view in the axial direction, showing part of a connecting piece and a crown portion of the end plate, and illustrating their relative disposition.

DESCRIPTION OF A PREFERRED EMBODIMENT OF THE INVENTION

Referring first to FIGS. 1, 2 and 3, the motor is a direct current motor for a motor vehicle ventilating blower. It has a casing which consists of a body shell 4 and an end plate 6 of plastics material, which is fixed to the body shell, together with a motor shaft 8 defining an axis of rotation 10. The body shell 4 has a cylindrical wall, centred on the axis 10 and having a cylindrical inner face 12, together with a base wall 14 which constitutes a closed end of the body shell at one end of its cylindrical wall. The end plate is generally in the form of a disc, and it closes the body shell 4 at the open end of the latter, so that the end plate is at the opposite end of the motor from the body shell base wall 14 in the axial direction.

The drive shaft 8 extends through a central hole in the base wall 14. One end of the shaft 8 is engaged rotatably in a plain bearing ring 16, which is fitted in a cylindrical housing defined by a fixed bearing element 18. The bearing element 18 projects from an internal face or wall 20 of the end plate. A circular edge of the end plate is fixed to a circular edge of the body shell 4, these two edges being orthogonal to the axis 10. To this end, the edge of the end plate is provided with fingers 22 (see FIG. 2) which are engaged with holes 24 in the edge of the body shell (see FIG. 3), together with resilient tongues 26 which exert a pressure on the body shell so as to take up the clearance produced by the fingers 22. The end plate carries four brushes on its internal face 20, for engaging with a commutator which is mounted on the drive shaft 8.

The motor has four permanent magnets or ferrites 28. Each of these magnets has a convex outer face 30 and a concave inner face 32, both of which are in the form of a frustum of a cylinder, both of these faces being concentric with the axis 10. Each magnet also has two flat end faces 34 and 36, which are parallel to each other and opposed to each other at right angles to the axis 10. The magnets 28 are disposed in the body shell 2 side by side, with their end faces being coplanar. The outer face 30 of the magnets lies against the inner face 12 of the body shell 4, thus making surface to surface contact with the latter. The end face 36 of each magnet bears against the base wall 14 of the body shell. The end plate faces towards the end face 34 of the magnets in the axial direction.

Reference is now made to FIGS. 3, 4 and 5 in particular. The motor has four connecting pieces 38, which are disposed between the magnets 28. These connecting pieces are press-formed sheet steel components. Each connecting piece comprises a body portion 40 of generally rectangular form, having three apertures formed through it, together with two side portions 42 which are bent back so as to project from the body portion 40 on each side of the latter, the side portions 42 being in facing relationship with each other. Each connecting piece 38 lies between two of the magnets 28, with its body portion 40 lying against the cylindrical internal face 12 of the body shell 4, and the side portions 42 lying against the magnets. Each side portion 42 has a flange 44 which is bent outwardly of the connecting piece towards the magnet which is in contact with that side portion, the flange being adjacent to the inner face 32 of the magnet. The side portion thus follows the profile of the adjacent magnet, and prevents the latter from being displaced in the radial direction.

The body portion 40 of each connecting piece 38 has an end portion 46 at one end, which projects with respect to the magnets in the axial direction. The connecting piece has two lugs 48 which project on either side of this end portion 46, forming lateral extensions of the latter. The lugs 48 are bent back somewhat, on the same side of the body portion 40 as are the side portions 42, i.e. towards the interior of the motor, so that the lugs lie facing the end faces 34 of the magnets in the axial direction, being adjacent to the face 34. The body portion 40 has two longitudinal ribs 50 which extend parallel to the side portions 42 as far as the end portion 46, thus giving the end portion 46 a slightly corrugated form.

The side portions 44 are convergent towards each other at the other end 51 of the body portion, so that the latter becomes narrower in this convergent part. This shape facilitates the introduction of the connecting piece between the magnets in a movement parallel to the axial direction.

With reference to FIGS. 1 and 2, the end plate 6 has four cylindrical crown portions 52 which are formed integrally by moulding, and which constitute together an interrupted crown centred on the axis 10. The crown portions 52 project from the inner face 20 of the end plate. They face towards the end faces 34 of the magnets, and towards the body portion 40 and lugs 48 of the respective connecting pieces 38, in the axial direction. The crown portions 52 are adjacent to the connecting pieces. FIG. 5 shows the alignment in the axial direction of one connecting piece 38 with the associated crown portion 52, together with the alignment, in the axial direction between the end faces 34 of the magnets (which are indicated here in broken lines), with the lugs 48 of the connecting piece. As can be seen in FIG. 1, the end portion 46 of the body of each connecting piece lies a few tenths of a millimetre in the axial direction away from the summit of the associated crown portion 52.

The various elements of the motor can be dimensioned in such a way that the end portion 46 of each connecting piece 38 is in contact with the summit of the associated crown portion 52. However, as in the present example, it is preferable to provide a short spacing in the axial direction between the end portion 46 of the connecting piece and the summit of the crown portion, in order to increase manufacturing tolerances of the elements of the motor, and to facilitate their assembly.

The motor is mounted in the vehicle with the axis 10 parallel to the direction of travel of the vehicle, with the end plate facing forwards in the direction of travel, towards the front of the vehicle. During severe deceleration of the vehicle, the magnets tend to be displaced axially towards the end plate 6. The magnets then come into, or make, axial contact with the lugs 48 of the connecting pieces, and the end portion 46 and lugs 48 of each connecting piece come into axial engagement on the summits of the adjacent crown portions 52. The corrugated profile of the end portion 46 increases the width of this engagement. The magnets 28 are thus retained against axial movement towards the end plate 6. Towards the base wall 14 of the motor body shell, the magnets 24 are again stopped from moving because they are in engagement against the base wall 14. In this way the magnets are retained against axial movement in both directions, without it being necessary to fix the connecting pieces 38 to the body shell 4.

Numerous modifications can of course be applied to the invention without departing from its scope. That part of the end plate which faces towards and is adjacent to the connecting pieces consists of four crown portions in this example, but the configuration of this part can of course be modified.

What is claimed is:

1. A permanent magnet motor comprising: a body shell having a cylindrical inner face; permanent magnets lying against said inner face and defining circumferential gaps between said magnets; and connecting pieces, each having a body portion with a width, each connecting piece body portion being disposed in a respective one of said gaps, each magnet having an end face, each connecting piece further having two lugs, each of which is so disposed as to lie in overlapping relationship with a said magnet end face, being axially adjacent to said magnet end face, wherein the motor further includes an end plate fixed to the body shell in axially facing relationship with said magnet end faces, with the connecting pieces and the end plate being so disposed in relation to each other that a portion of the end plate lies facing towards the connecting pieces in the axial direction, being adjacent to the connecting pieces and wherein the body shell defines an axis thereof, the end plate having a plurality of cylindrical crown portions spaced from each other at least by said respective connecting piece body portion widths, said crown portions being coaxial with the body shell and protecting from the end plate in facing relationship with the connecting pieces in the axial direction, said crown portions being adjacent to the connecting pieces.

2. A motor according to claim 1, wherein the body shell has a base wall axially opposite to the end plate, the magnets being in abutment against the said base wall.

3. A motor according to claim 1, being a motor of a motor vehicle ventilating system.

* * * * *